United States Patent
Tang

(10) Patent No.: US 12,174,828 B2
(45) Date of Patent: Dec. 24, 2024

(54) DRIVING DATA PROCESSING METHOD, APPARATUS, DEVICE, AUTOMATIC DRIVING VEHICLE, MEDIUM AND PRODUCT

(71) Applicant: Apollo Intelligent Driving Technology (Beijing) Co., Ltd., Beijing (CN)

(72) Inventor: Hongxiang Tang, Beijing (CN)

(73) Assignee: APOLLO INTELLIGENT DRIVING TECHNOLOGY (BEIJING) CO., LTD. (CN)

( * ) Notice: Subject to any disclaimer, the term of this patent is extended or adjusted under 35 U.S.C. 154(b) by 0 days.

(21) Appl. No.: 18/111,930

(22) Filed: Feb. 21, 2023

(65) Prior Publication Data

US 2023/0267117 A1   Aug. 24, 2023

(30) Foreign Application Priority Data

Feb. 22, 2022   (CN) .......................... 202210162852.5

(51) Int. Cl.
  G06F 17/30    (2006.01)
  G06F 16/2453  (2019.01)
  (Continued)

(52) U.S. Cl.
  CPC .... *G06F 16/2453* (2019.01); *G06F 16/24553* (2019.01); *G06F 16/284* (2019.01); *G07C 5/008* (2013.01)

(58) Field of Classification Search
  CPC .............. B60W 30/0618; B60W 60/00; G05D 1/0088; G06F 16/13; G06F 16/24;
  (Continued)

(56) References Cited

U.S. PATENT DOCUMENTS

| | | | |
|---|---|---|---|
| 7,225,201 B1 | 5/2007 | Milby | |
| 2016/0047660 A1* | 2/2016 | Fausten | G05D 1/0221 701/25 |

(Continued)

FOREIGN PATENT DOCUMENTS

| | | |
|---|---|---|
| CN | 102270223 A | 12/2011 |
| CN | 108494721 A | 9/2018 |

(Continued)

OTHER PUBLICATIONS

Chu, X et al., Design of Driver Operation Database and Its Collecting System, China Safety Science Journal, Jan. 2005, vol. 15, No. 1, pp. 29-33.

(Continued)

*Primary Examiner* — Hung D Le
(74) *Attorney, Agent, or Firm* — Dilworth IP, LLC

(57) ABSTRACT

The present disclosure provides a driving data processing method, an apparatus, a device, an automatic driving vehicle, a medium and a product, including: collecting first driving data generated by using a target structure in a driving system of a target vehicle, where the first driving data uses a binary number system; determining a target descriptor corresponding to the target structure, where the target descriptor is used to describe member information of the target structure; parsing the target descriptor to obtain at least one piece of member information of the target structure; parsing the first driving data according to the at least one piece of the member information to obtain target data corresponding to each of the at least one piece of the member information; and performing a data processing operation based on the target data corresponding to each of the at least one piece of the member information.

14 Claims, 5 Drawing Sheets

(51) Int. Cl.
*G06F 16/2455* (2019.01)
*G06F 16/28* (2019.01)
*G07C 5/00* (2006.01)

(58) Field of Classification Search
CPC .......... G06F 16/156; G06N 3/00; G06N 5/00; G05B 13/00
See application file for complete search history.

(56) References Cited

U.S. PATENT DOCUMENTS

| | | | | |
|---|---|---|---|---|
| 2016/0137142 | A1* | 5/2016 | Nemat-Nasser | B60R 11/04 386/227 |
| 2016/0144857 | A1* | 5/2016 | Ohshima | B60W 50/082 701/23 |
| 2017/0072963 | A1* | 3/2017 | Matsuno | B60W 30/10 |
| 2017/0122754 | A1* | 5/2017 | Konishi | B60W 30/18154 |
| 2017/0123423 | A1* | 5/2017 | Sako | G01C 21/3438 |
| 2017/0225691 | A1* | 8/2017 | Yamada | G08G 1/096791 |
| 2017/0261984 | A1* | 9/2017 | Ichikawa | B60W 50/082 |
| 2017/0273118 | A1* | 9/2017 | Hasegawa | H04W 76/10 |
| 2017/0339095 | A1 | 11/2017 | Lei et al. | |
| 2018/0074497 | A1* | 3/2018 | Tsuji | B60W 30/18163 |
| 2018/0079413 | A1* | 3/2018 | Herrero | G06Q 50/40 |
| 2018/0129205 | A1* | 5/2018 | Choi | G06N 20/00 |
| 2018/0284791 | A1* | 10/2018 | Furukawa | G05D 1/0088 |
| 2019/0111925 | A1* | 4/2019 | Sata | B60W 10/30 |
| 2019/0382000 | A1* | 12/2019 | Song | B60W 30/025 |
| 2020/0012281 | A1* | 1/2020 | Jaegal | G05D 1/0094 |
| 2020/0073376 | A1* | 3/2020 | Yang | G05D 1/0011 |
| 2020/0073377 | A1* | 3/2020 | Yang | H04W 72/543 |
| 2020/0081701 | A1* | 3/2020 | Cui | G07C 5/008 |
| 2020/0090426 | A1* | 3/2020 | Barnes | G06N 5/01 |
| 2020/0180639 | A1* | 6/2020 | Mizoguchi | G05D 1/0088 |
| 2020/0201321 | A1* | 6/2020 | Tanaka | G05D 1/65 |
| 2020/0290640 | A1* | 9/2020 | Schuller | B60W 30/06 |
| 2020/0339159 | A1* | 10/2020 | Zhong | G08G 1/017 |
| 2020/0361495 | A1* | 11/2020 | Namba | G01C 21/3617 |
| 2020/0364953 | A1* | 11/2020 | Simoudis | B60W 60/001 |
| 2021/0001880 | A1* | 1/2021 | Hu | G05D 1/0251 |
| 2021/0157333 | A1* | 5/2021 | Sasaki | G05D 1/0231 |
| 2021/0188296 | A1* | 6/2021 | Ma | B60W 40/13 |
| 2021/0360850 | A1* | 11/2021 | Wu | A01D 41/1278 |
| 2021/0365037 | A1* | 11/2021 | Wu | G06V 20/56 |
| 2021/0370962 | A1* | 12/2021 | Zhu | B60W 50/085 |
| 2022/0020267 | A1 | 1/2022 | Liao et al. | |
| 2022/0097728 | A1* | 3/2022 | Lin | B60W 30/18009 |
| 2022/0161819 | A1* | 5/2022 | Fedeli | B60W 30/14 |
| 2022/0219731 | A1* | 7/2022 | Ran | G06V 20/597 |
| 2022/0227392 | A1* | 7/2022 | Ishimaru | B60W 30/0956 |
| 2022/0289254 | A1* | 9/2022 | Tsushima | B60W 30/0956 |
| 2022/0324478 | A1* | 10/2022 | Mashimo | H04W 4/44 |
| 2022/0371615 | A1* | 11/2022 | Nishiwaki | G08G 1/161 |
| 2023/0282036 | A1* | 9/2023 | Simoudis | G06N 3/08 |

FOREIGN PATENT DOCUMENTS

| | | |
|---|---|---|
| CN | 110069259 A | 7/2019 |
| CN | 110086891 A | 8/2019 |
| CN | 111083030 A | 4/2020 |
| CN | 111738458 A | 10/2020 |
| CN | 113364732 A | 9/2021 |
| CN | 113553304 A | 10/2021 |
| CN | 113872967 A | 12/2021 |
| DE | 102020101576 A1 | 8/2020 |
| WO | 2013026187 A1 | 2/2013 |

OTHER PUBLICATIONS

First Office Action in CN Patent Application No. 202210162852.5 dated Aug. 15, 2022.
Notice of Allowance in CN Patent Application No. 202210162852.5 dated Jan. 5, 2023.
European Search Report in EP Patent Application No. 23157331.2 dated May 9, 2023.

* cited by examiner

DRIVING DATA PROCESSING METHOD, APPARATUS, DEVICE, AUTOMATIC DRIVING VEHICLE, MEDIUM AND PRODUCT

CROSS-REFERENCES TO RELATED APPLICATIONS

This application claims priority to Chinese patent application No. 202210162852.5, filed on Feb. 22, 2022 and entitled "DRIVING DATA PROCESSING METHOD, APPARATUS, DEVICE, AUTOMATIC DRIVING VEHICLE, MEDIUM AND PRODUCT". The content of the above application is hereby incorporated by reference in its entirety.

TECHNICAL FIELD

The present disclosure relates to the field of artificial intelligence and, in particular, to a driving data processing method, an apparatus, a device, an automatic driving vehicle, a medium and a product, which are applied to the field of automatic driving.

BACKGROUND

An automatic driving system or assisted driving system refers to a software system that controls vehicle driving using programming technology. During vehicle driving, the driving system may collect driving data of a vehicle, and the driving data may include, for example, different application types of data such as position data, trajectory data, interaction data, control data and/or communication data. In order to accurately define or use the driving data of the driving system, an interactive data language (IDL) can be used to define a communication structure, and an IDL text corresponding to a corresponding structure type can be obtained. Object data in the driving system can be generated through the structure in the IDL text, and then the driving data can be transmitted to a server. The server can parse the driving data. However, since the server cannot obtain the IDL text of the driving system, object members in the structure cannot be determined. The driving data consists of binary member data, but the driving data defined by a structure object cannot be parsed, resulting in a failure of driving data parsing.

SUMMARY

The present disclosure provides a driving data processing method, an apparatus, a device, an automatic driving vehicle, a medium and a product that are applied in a driving system of a vehicle.

According to a first aspect of the present disclosure, a driving data processing method is provided, including:
collecting first driving data generated by using a target structure in a driving system of a target vehicle; where the first driving data uses a binary number system;
determining a target descriptor corresponding to the target structure from at least one structure descriptor of a description pool; where the target descriptor is used to describe member information of the target structure;
parsing the target descriptor to obtain at least one piece of member information of the target structure;
parsing the first driving data according to the at least one piece of the member information to obtain target data corresponding to each of the at least one piece of the member information; where the target data uses a decimal number system; and
performing a data processing operation based on the target data corresponding to each of the at least one piece of the member information.

According to a second aspect of the present disclosure, a driving data processing method is provided, including:
receiving a data collection request sent by an electronic device;
in response to the data collection request, determining a target descriptor corresponding to a target structure;
sending the target descriptor to the electronic device; and
sending first driving data generated by using the target structure to the electronic device; where the first driving data uses a binary number system; the first driving data is converted into target data corresponding to at least one piece of member information respectively by the electronic device using the target descriptor of the target structure; and the target data uses a decimal number system.

According to a third aspect of the present disclosure, a driving data processing apparatus is provided, including:
at least one processor; and
a memory communicatively connected to the at least one processor; where,
the memory stores instructions executable by the at least one processor, and the at least one processor is configured to:
collect first driving data generated by using a target structure in a driving system of a target vehicle; where the first driving data uses a binary number system;
determine a target descriptor corresponding to the target structure from at least one structure descriptor of a description pool; where the target descriptor is used to describe member information of the target structure;
parse the target descriptor to obtain at least one piece of member information of the target structure;
parse the first driving data according to the at least one piece of the member information to obtain target data corresponding to each of the at least one piece of the member information; where the target data uses a decimal number system; and
perform a data processing operation based on the target data corresponding to each of the at least one piece of the member information.

According to a fourth aspect of the present disclosure, a driving data processing apparatus is provided, including:
at least one processor; the at least one processor being configured with a driving system of the automatic driving vehicle; and
a memory communicatively connected to the at least one processor; where,
the memory stores instructions executable by the at least one processor, and the at least one processor is configured to:
receive a data collection request sent by an electronic device;
in response to the data collection request, determine a target descriptor corresponding to a target structure;
send the target descriptor to the electronic device; and
send first driving data generated by using the target structure to the electronic device; where the first driving data uses a binary number system; the first driving data is converted into target data corresponding to at least one piece of member information respectively by the electronic device using the target descriptor of the target structure; and the target data uses a decimal number system.

According to a fifth aspect of the present disclosure, a non-transitory computer readable storage medium having computer instructions stored thereon is provided, where the computer instructions are used to cause a computer to execute the method according to the first aspect or the second aspect.

It should be understood that, content described in this section is not intended to identify essential or important features of embodiments of the present disclosure, nor is it intended to limit the scope of the present disclosure. Other features of the present disclosure will be readily understood by the following description.

BRIEF DESCRIPTION OF DRAWINGS

The accompanying drawings are for a better understanding of the solutions and do not constitute a limitation of the present disclosure.

DESCRIPTION OF EMBODIMENTS

Figure 1:
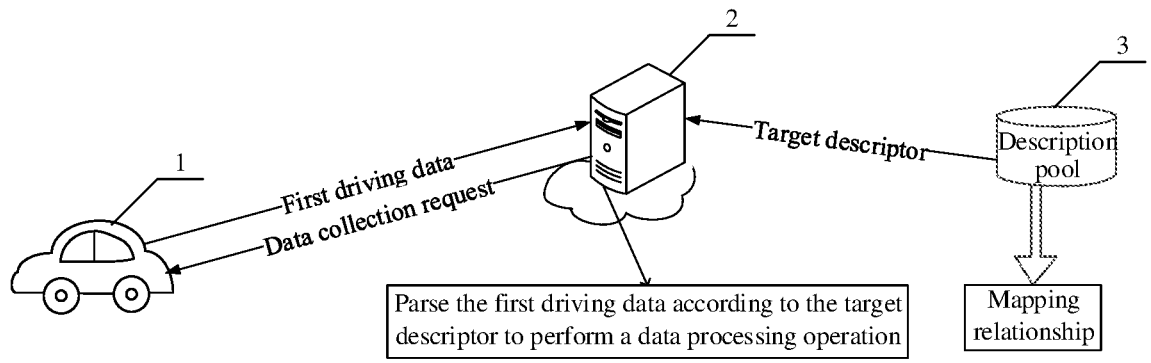
FIG. 1 is a schematic diagram of an application scenario of a driving system processing method provided according to a first embodiment of the present disclosure.

Exemplary embodiments of the present disclosure are described below in conjunction with the accompanying drawings, including various details of the embodiments of the present disclosure for ease of understanding, which should be considered merely exemplary. Accordingly, those skilled in the art should recognize that various changes and modifications of the embodiments described herein can be made without departing from the scope and spirit of the present disclosure. Also, for the sake of clarity and conciseness, the description of well-known functions and structures is omitted from the following description.

The technical solutions of the present disclosure may be applied to a scenario of monitoring vehicle data. For driving data of a structure type, a descriptor may be used to parse member information of a structure to parse the driving data and realize accurate processing of the data of the structure type.

In the related art, a driving system, such as an automatic driving system or an assisted driving system, may collect data generated during a driving process of a vehicle. Generally, the driving system may collect driving data of the vehicle, and the driving data may include, for example, at least one of position data, trajectory data, interaction data, control data and communication data. Generally, the driving data can be defined by a structure type, and in a practical application, an interactive data language (Interactive Data Language, IDL) may be used to define the structure type. In order to accurately monitor a driving situation of the vehicle, an electronic device may collect driving data from the driving system. In a practical application, when a target vehicle communicates with the electronic device, data transmission is usually carried out using a binary number system. Therefore, after the electronic device obtains the driving data, the driving data needs to be parsed to obtain decimal data and then to realize data processing. However, the electronic device cannot directly obtain an IDL text of a structure from the driving system, which results in the electronic device not being able to parse the driving data recorded in the binary number system, and thus unable to complete monitoring of the driving system, resulting in a monitoring failure.

In order to solve the above problems, the present disclosure provides a driving data processing method, an apparatus, a device, an automatic driving vehicle, a storage medium and a product, which are applied to the automatic driving field in the field of artificial intelligence, so as to achieve a goal of accurately monitoring driving data in a driving process. According to the technology of the present disclosure, a problem that driving data of a structure cannot be accurately parsed is solved.

In the present disclosure, a generated structure descriptor is adopted to record member information in a structure and obtain object information of a structure object. Through the structure descriptor, driving data can be accurately parsed from binary to decimal, which realizes effectively processing of structure data.

In an embodiment of the present disclosure, first driving data generated by using a target structure in a driving system of a target vehicle can be collected, and the first driving data is represented by a binary number system. A target descriptor corresponding to the target structure is determined, and the target descriptor describes member information of the target structure. By parsing the target descriptor, at least one piece of member information of the structure can be obtained, which realizes an acquisition of member information of the target structure. Further, the collected first driving data is parsed according to the at least one piece of the member information to obtain target data corresponding to each of the at least one piece of the member information. The target data is represented in a decimal number system, which realizes accurate and effective parsing of data. A data processing operation is performed by using the target data corresponding to the at least one piece of the member information respectively, which realizes accurate data processing of the collected first driving data and accurate monitoring of the driving data of the target vehicle.

The technical solutions of the present disclosure will be described in detail below with reference to the accompanying drawings.

As shown in FIG. 1, FIG. 1 is a schematic diagram of an application scenario of a driving data processing method provided according to a first embodiment of the present disclosure. The application scenario may include a target vehicle 1 in a driving process, and the target vehicle may be configured with a driving system. The target vehicle 1 may establish a communication connection with an electronic device, such as a cloud server 2. In a practical application, the electronic device 2 may include: a computer, a supercomputer, a notebook computer, a common server, a cloud server, etc. A specific type of the electronic device is not limited too much in the embodiments of the present disclosure. The driving system may generate first driving data while the vehicle is travelling. When receiving a data collection request from the electronic device 2, the target vehicle may send the first driving data to the electronic device 2. The electronic device 2 may use the driving data processing method provided by the present disclosure to obtain at least one piece of member information of a target structure by using a target descriptor, so as to parse the driving data to obtain target data corresponding to each of the at least one piece of the member information, and to perform a data processing operation based on the target data corresponding to each of the at least one piece of the member information, which completes effective processing of the driving data generated by the target vehicle and improves a processing efficiency of data. The electronic device 2 may obtain the target descriptor corresponding to the target structure from a description pool 3.

Figure 2:
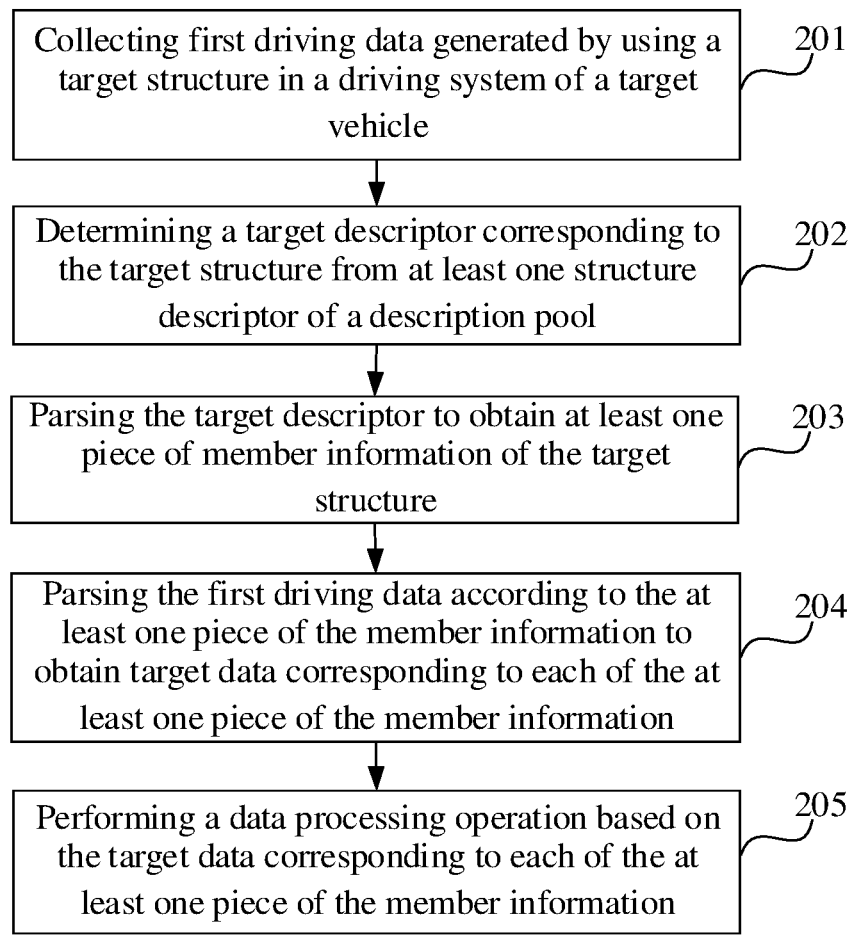
FIG. 2 is a flowchart of a driving data processing method provided according to a second embodiment of the present disclosure.

As shown in FIG. 2, FIG. 2 is a flowchart of a driving data processing method provided according to a second embodiment of the present disclosure. The method may be executed by a driving data processing apparatus, and the driving data processing apparatus may be configured in an electronic device. The driving data processing method may include the following steps.

201: collecting first driving data generated by using a target structure in a driving system of a target vehicle; where the first driving data uses a binary number system.

Collecting the first driving data generated by using the target structure in the driving system of the target vehicle may include: generating a data collection request, sending the data collection request to the driving system of the target vehicle, and receiving the first driving data sent by the driving system. The first driving data is generated by using the target structure. The target structure may be any structure defined in the driving system.

In an implementation, the target structure may be a structure generated by using an IDL language. The driving system cannot send an IDL text of the target structure to the electronic device.

202: determining a target descriptor corresponding to the target structure from at least one structure descriptor of a description pool; where the target descriptor is used to describe member information of the target structure.

If it is determined that the IDL text corresponding to the driving data is not detected, the electronic device can determine the target descriptor corresponding to the target structure from the at least one structure descriptor of the description pool. The target descriptor is used to describe the member information of the target structure.

In an implementation, the target descriptor corresponding to the target structure may be sent simultaneously with the first driving data generated by the target vehicle using the target structure. The target descriptor may be obtained by running a descriptor generation function corresponding to the target structure by the target vehicle. Determining the target descriptor corresponding to the target structure may include: receiving the target descriptor sent simultaneously with the first driving data.

When sending the first driving data to the electronic device, the target vehicle can also send the target descriptor corresponding to the target structure to the electronic device at the same time.

203: parsing the target descriptor to obtain at least one piece of member information of the target structure.

The target descriptor may include information or content that records a structure type, member information, a modifier and the like of the target structure. At least one piece of member information of the target structure may be obtained by parsing the target descriptor. Parsing the target descriptor may include dividing the structure type and the member information of the target descriptor to obtain the at least one piece of the member information. The member information may include a member type and a member name.

204: parsing the first driving data according to the at least one piece of the member information to obtain target data corresponding to each of the at least one piece of the member information; where the target data uses a decimal number system.

In an implementation, parsing the first driving data according to the at least one piece of the member information to obtain the target data corresponding to each of the at least one piece of the member information may include: converting the first driving data into a character string, and parsing the character string into the target data corresponding to the at least one piece of the member information respectively according to the at least one piece of the member information. The first driving data is converted into the character string, which may include a member name, member data, a modifier, etc. The character string may be divided through the at least one piece of the member information to obtain each piece of member information and extract the target data corresponding to each piece of the member information, to obtain the target data corresponding to each of the at least one piece of the member information. The target data corresponding to the member information may include normal data and null data.

205: performing a data processing operation based on the target data corresponding to each of the at least one piece of the member information.

In the embodiment of the present disclosure, the first driving data generated by using the target structure in the driving system of the target vehicle can be collected, and the first driving data is represented by the binary number system. The target descriptor corresponding to the target structure is determined, and the target descriptor describes the member information of the target structure. By parsing the target descriptor, at least one piece of member information of the structure can be obtained, which realizes an acquisition of the member information of the target structure. Further, the collected first driving data is parsed according to the at least one piece of the member information to obtain the target data corresponding to each of the at least one piece of the member information. The target data is represented by the decimal number system, which realizes accurate and effective parsing of data. The data processing operation is performed by using the target data corresponding to the at least one piece of the member information, which realizes accurate data processing of the collected first driving data and accurate monitoring of the driving data of the target vehicle.

Figure 3:
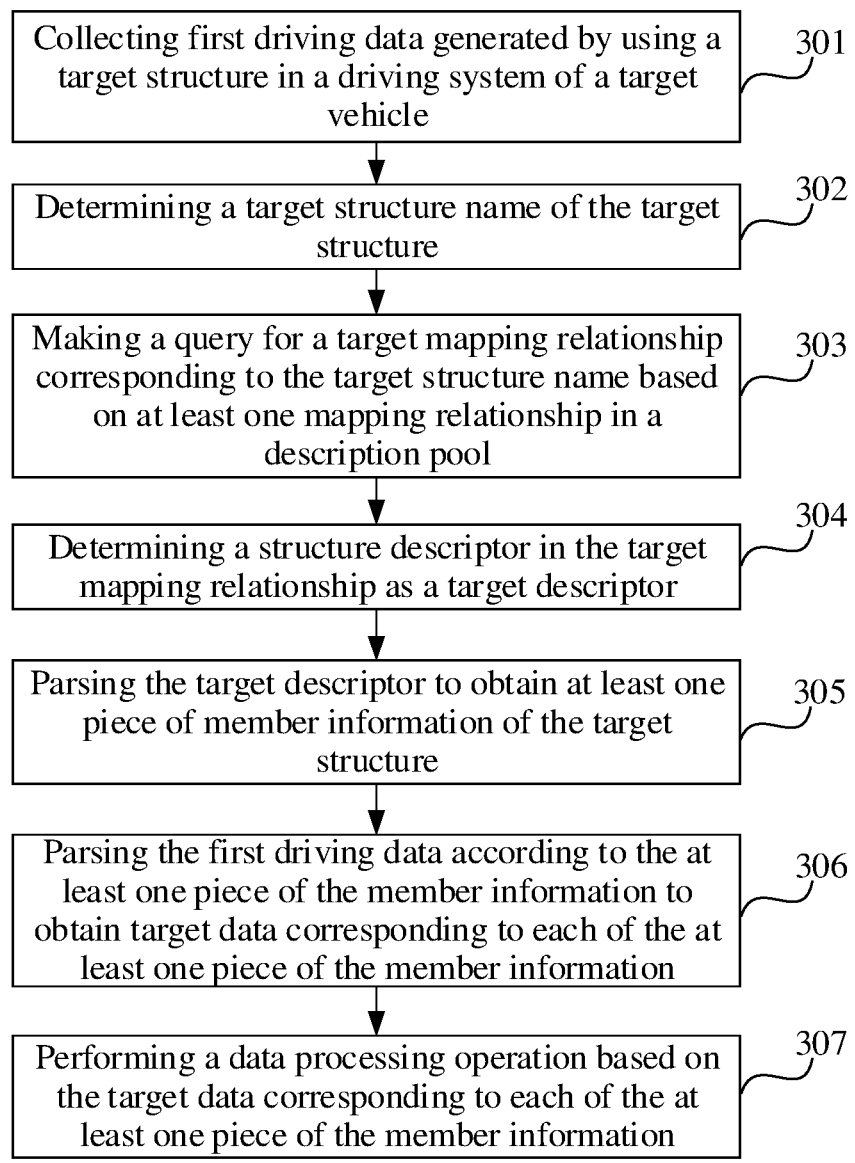
FIG. 3 is a flowchart of a driving data processing method provided according to a third embodiment of the present disclosure.

As shown in FIG. 3, FIG. 3 is a flowchart of a driving data processing method provided according to a third embodiment of the present disclosure. The method may be executed by a driving data processing apparatus, and the driving data processing apparatus may be configured in an electronic device. The driving data processing method may include the following steps.

301: collecting first driving data generated by using a target structure in a driving system of a target vehicle; where the first driving data uses a binary number system.

Some steps in the embodiment of the present disclosure are the same as some steps in the embodiment shown in FIG. 2, and are not repeated here for the sake of brevity of description.

The first driving data may be data corresponding to a structure object generated by using the target structure. The first driving data may use a decimal number system when being generated, and be converted into binary data and represented by a binary number system when being transmitted from the driving system to the electronic device.

302: determining a target structure name of the target structure.

In an implementation, determining the target structure name of the target structure may include: determining the target structure name of the target structure based on the first driving data. Initial driving data corresponding to the first driving data may be obtained, and the target structure name of the target structure may be determined according to the initial driving data corresponding to the first driving data. The first driving data may also be parsed, and the target structure name of the target structure may be obtained from the first driving data.

303: making a query for a target mapping relationship corresponding to the target structure name based on at least one mapping relationship in the description pool; where the mapping relationship includes a corresponding relationship between a structure name and a structure descriptor.

304: determining a structure descriptor in the target mapping relationship as the target descriptor; where the target descriptor is used to describe member information of the target structure.

305: parsing the target descriptor to obtain at least one piece of member information of the target structure.

306: parsing the first driving data according to the at least one piece of the member information to obtain target data corresponding to each of the at least one piece of the member information; where the target data uses a decimal number system.

307: performing a data processing operation based on the target data corresponding to each of the at least one piece of the member information.

In the embodiment of the present disclosure, the target structure name of the target structure is determined according to the first driving data, and a query for the target mapping relationship corresponding to the target structure name may be made according to the at least one mapping relationship in the description pool. The mapping relationship includes the corresponding relationship between the structure name and the structure descriptor. When the target mapping relationship is found by the query, the corresponding structure descriptor can be determined as the target descriptor from the target mapping relationship. Through the mapping relationship, fast and accurate query of the target descriptor of the target structure can be realized, and the acquisition efficiency and accuracy of the target descriptor can be improved.

In a possible design, any mapping relationship in the description pool may be established in advance, and the method may also include the following steps for establishing the mapping relationship:

receiving a structure descriptor and initial driving data corresponding to any structure sent by the driving system;

determining a structure name of the structure according to the initial driving data; and establishing a mapping relationship between the structure descriptor and the structure name, and storing the mapping relationship in the description pool.

In an implementation, determining the structure name of the structure according to the initial driving data may include: converting the initial driving data into decimal data to obtain the initial driving data represented in decimal. The structure name of the structure is read from the initial driving data.

In a possible design, an object name can be set to be the same as the structure name of the corresponding structure in the initial driving data, so as to read the object name from the initial driving data as the structure name.

In the embodiment of the present disclosure, the structure descriptor and the initial driving data corresponding to any structure sent by the driving system are received. The structure name of the structure is determined according to the initial driving data. After obtaining the structure name and the structure descriptor, a mapping relationship between the structure descriptor and the structure name may be established, and the mapping relationship may be stored in the description pool. By establishing the mapping relationship between the structure descriptor and the structure name, a corresponding storage of the descriptor and the structure can be realized. When the descriptor needs to be used, a query for the target descriptor corresponding to the target structure can be made quickly through the mapping relationship, which improves an acquisition efficiency of the descriptor.

As an embodiment, the data processing operation includes a data acquisition operation, and performing the data processing operation based on the target data corresponding to each of the at least one piece of the member information includes:

determining a data acquisition request for first member information of the at least one piece of the member information; and in response to the data acquisition request, determining target data of the first member information as request data corresponding to the data acquisition request, and outputting the request data.

In an implementation, determining the data acquisition request for the first member information of the at least one piece of the member information includes: outputting at least one piece of member information for a user; detecting the first member information selected by the user from the at least one piece of the member information. The first member information may be any one of the at least one piece of the member information.

In the embodiment of the present disclosure, when the data processing operation is the data acquisition operation, the data acquisition request for the first member information of the at least one piece of the member information can be determined, so as to realize a confirmation of a member which corresponds to the data acquisition request and whose data is acquired. By responding to the data acquisition request, the target data of the first member information can be determined as the request data corresponding to the data acquisition request, and the request data can be output. Through accurate positioning of the member information, data acquisition can be realized quickly and accurately.

As another embodiment, the data processing operation includes a data setting operation, and performing the data processing operation based on the target data corresponding to each of the at least one piece of the member information includes:

determining a data setting request for second member information of the at least one piece of the member information; where the data setting request includes setting data; and in response to the data setting request, updating target data of the second member information to the setting data.

In an implementation, determining the data setting request for the second member information of the at least one piece of the member information may include: outputting at least one piece of member information and the target data corresponding to the at least one piece of the member information respectively for a user; detecting the second member information selected by the user from the at least one piece of the member information, and the setting data determined for the second member information. The target data of the second member information is not null.

In the embodiment of the present disclosure, when the data processing operation is the data setting operation, the data setting request for the second member information of the at least one piece of the member information can be determined, and the data setting request includes the setting data. The setting data is member data set for the second member information. By responding to the data setting request, the target data of the second member information can be updated to the setting data, so as to realize fast and accurate setting of the second member information.

As another embodiment, the data processing operation includes a data addition operation, and performing the data processing operation based on the target data corresponding to each of the at least one piece of the member information includes:

determining a data addition request for third member information of the at least one piece of the member information; where the data addition request includes added third member information and added data corresponding to the third member information; and in response to the data addition request, generating a data member corresponding to the third member information, and determining the added data as target data of the data member of the third member information.

The data addition request may be initiated by a user. The electronic device may detect the data addition request initiated by the user. Determining the data addition request for the third member information of the at least one piece of the member information may include: outputting at least one piece of member information for the user, detecting added data set by the user for the third member information of the at least one piece of the member information, and generating the data addition request according to the added data of the third member information. The target data of the third member information is null. That is, the user selects the third member information from member information whose target data is null.

In the embodiment of the present disclosure, when the data processing operation is the data addition operation, the data addition request corresponding to the added third member information may be determined. The electronic device may generate the data member for the third member information in response to the data addition request, and set the added data as the target data of the data member of the third member information. By setting the added third member information and the corresponding added data, the addition operation for the member is realized and accurate addition of the data member of the structure is realized.

In some embodiments, after parsing the target descriptor to obtain the at least one piece of the member information of the target structure, the method further includes:

determining an object creation request of the target structure;

in response to the object creation request, generating a target object corresponding to the target structure;

determining target member information of the target object in the at least one piece of the member information; and obtaining second driving data corresponding to the target object based on member data of the target member information.

In an implementation, determining the object creation request of the target structure may include: detecting the object creation request of the target structure initiated by a user. The target object is a structure object created by using the target structure. The target object may use the at least one piece of the member information of the target structure. The target member information of the target object in the at least one piece of the member information may be set by the user. Determining the target member information of the target object in the at least one piece of the member information may include: outputting at least one piece of member information for the user and detecting the target member information determined by the user. Detecting of the member data set by the user for the target member information may also be included. The member data may be obtained by the user setting. The second driving data may be the member data corresponding to the target member information.

In the embodiment of the present disclosure, the object creation request of the target structure is determined, and the target object corresponding to the target structure may be generated in response to the object creation request. The target member information of the target object in the at least one piece of the member information is determined, so as to determine the member information of the target member information, and obtain the second driving data corresponding to the target object. Using the at least one piece of the member information, a new target object can be created for the target structure, and creation efficiency and accuracy of the target structure can be improved.

Figure 4:
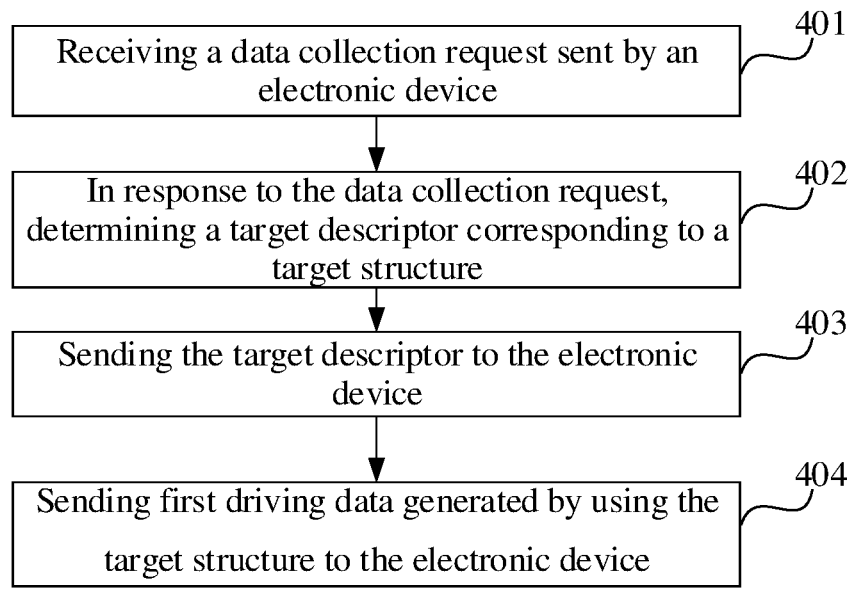
FIG. 4 is a flowchart of a driving data processing method provided according to a fourth embodiment of the present disclosure.

As shown in FIG. 4, FIG. 4 is a flowchart of a driving data processing method provided according to a fourth embodiment of the present disclosure. The method may be executed by a driving data processing apparatus, and the driving data processing apparatus may be configured in a target vehicle. The driving data processing method may include the following steps.

401: receiving a data collection request sent by an electronic device.

For the detailed steps in the embodiments of the present disclosure, the description of the target vehicle in the foregoing embodiments can be referred to, and will not be repeated here.

402: in response to the data collection request, determining a target descriptor corresponding to a target structure.

403: sending the target descriptor to the electronic device.

404: sending first driving data generated by using the target structure to the electronic device; where the first driving data uses a binary number system; the first driving data is converted into target data corresponding to at least one piece of member information respectively by the electronic device using the target descriptor of the target structure; and the target data uses a decimal number system.

In an implementation, the target descriptor of the target structure and the first driving data may be sent simultaneously to the electronic device.

In the embodiment of the present disclosure, the target vehicle receives the data acquisition request sent by the electronic device, and determines the target descriptor corresponding to the target structure in response to the data collection request. The target descriptor is sent to the electronic device. The first driving data generated by using the target structure is sent to the electronic device. The first driving data is represented in binary. The first driving data is converted into the target data corresponding to the at least one piece of the member information respectively by the electronic device using the target descriptor of the target structure. The target data is represented in decimal. By sending the target descriptor and the first driving data to the electronic device, the electronic device can accurately parse the first driving data using the target descriptor, which realizes accurate monitoring of the driving data in the driving system of the target vehicle.

As an embodiment, determining the target descriptor corresponding to the target structure includes:

running a descriptor generation function corresponding to the target structure to obtain the target descriptor corresponding to the target structure.

In an implementation, a script file for the descriptor generation function may be determined. When running the descriptor generation function corresponding to the target structure, a structure name of the target structure may be inputted into the descriptor generation function corresponding to the script file as function input data. An operation of running the descriptor generation function of the target structure is completed, and the target descriptor corresponding to the target structure is obtained.

In the embodiment of the present disclosure, the target descriptor of the target structure can be obtained by running the descriptor generation function of the target structure, so as to realize rapid generation of the target descriptor. Through the descriptor generation function, automatic generation of the descriptor can be realized and generation efficiency of the descriptor can be improved.

In a possible design, the method can also include:

generating initial driving data based on the target structure;

where sending the target descriptor to the electronic device includes:

sending the target descriptor and the initial driving data to the electronic device, where the initial driving data is used to determine a structure name of the target structure, and a mapping relationship between the structure name and the target descriptor is stored in a description pool.

Generating the initial driving data based on the target structure may include: generating a name structure object according to the structure name of the target structure; setting member data for at least one piece of member information in the name structure object respectively to obtain the initial driving data. The initial driving data forms the structure object as a whole, and an object name of the structure object is the structure name of the target structure. When the initial driving data is obtained, the object name of the structure object may be read from the initial driving data, and the obtained object name is the structure name of the target structure.

Generating the initial driving data based on the target structure may include: generating an initial object according to the target structure, setting initial data for at least one piece of member information of the initial object respectively, and obtaining initial driving data formed by the initial data corresponding to the at least one piece of the member information of the initial object. The structure name of the target structure may be determined from the initial driving data.

In the embodiment of the present disclosure, the initial driving data can be generated based on the target structure, and after sending the target descriptor and the initial driving data to the electronic device, the initial driving data can be used to determine the structure name of the target structure. The mapping relationship between the structure name and the target descriptor is stored in the description pool, which realizes the storage of the mapping relationship between the structure name and the target descriptor. Existence of the mapping relationship can realize rapid acquisition of the structure descriptor and improve acquisition efficiency of the descriptor.

Figure 5:
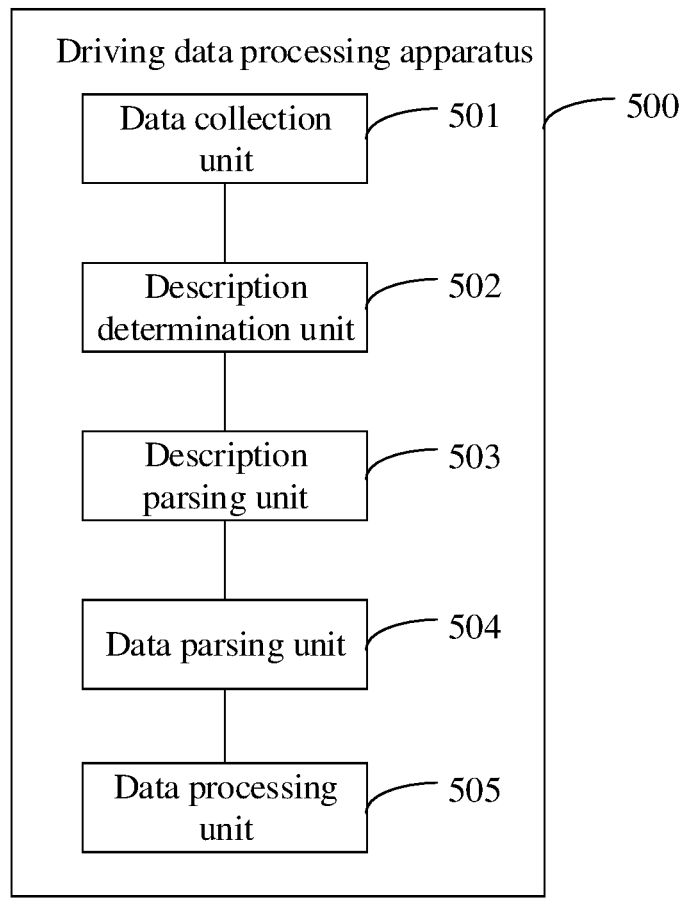
FIG. 5 is a schematic structural diagram of a driving data processing apparatus provided according to a fifth embodiment of the present disclosure.

As shown in FIG. 5, FIG. 5 is a schematic structural diagram of a driving data processing apparatus according to a fifth embodiment of the present disclosure. The driving data processing apparatus may be configured in an electronic device. The driving data processing apparatus 500 can include the following units:

a data collection unit 501, configured to collect first driving data generated by using a target structure in a driving system of a target vehicle; where the first driving data uses a binary number system;

a description determination unit 502, configured to determine a target descriptor corresponding to the target structure; where the target descriptor is used to describe member information of the target structure;

a description parsing unit 503, configured to parse the target descriptor to obtain at least one piece of member information of the target structure;

a data parsing unit 504, configured to parse the first driving data according to the at least one piece of the member information to obtain target data corresponding to each of the at least one piece of the member information; where the target data uses a decimal number system; and a data processing unit 505, configured to perform a data processing operation based on the target data corresponding to each of the at least one piece of the member information.

In the embodiment of the present disclosure, the first driving data generated by using the target structure in the driving system of the target vehicle can be collected, and the first driving data is represented by the binary number system. The target descriptor corresponding to the target structure is determined, and the target descriptor describes the member information of the target structure. By parsing the target descriptor, at least one piece of member information of the structure can be obtained, which realizes an acquisition of the member information of the target structure. Further, the collected first driving data is parsed according to the at least one piece of the member information to obtain the target data corresponding to each of the at least one piece of the member information. The target data is represented by the decimal number system, which realizes accurate and effective parsing of data. The data processing operation is performed by using the target data corresponding to the at least one piece of the member information respectively, which realizes accurate data processing of the collected first driving data and accurate monitoring of the driving data of the target vehicle.

As an embodiment, the description determination unit includes:
- a name determination module, configured to determine a target structure name of the target structure;
- a mapping query module, configured to make a query for a target mapping relationship corresponding to the target structure name based on at least one mapping relationship in the description pool; where the mapping relationship includes a corresponding relationship between a structure name and a structure descriptor; and
- a target determination module, configured to determine a structure descriptor in the target mapping relationship as the target descriptor.

In a possible design, the apparatus further includes:
- a data receiving unit, configured to receive a structure descriptor and initial driving data corresponding to any structure sent by the driving system;
- a name determination unit, configured to determine a structure name of the structure according to the initial driving data; and
- a mapping establishment unit, configured to establish a mapping relationship between the structure descriptor and the structure name, and store the mapping relationship in the description pool.

In some embodiments, the data processing operation includes a data acquisition operation, and the data processing unit includes:
- a first determination module, configured to determine a data acquisition request for first member information of the at least one piece of the member information; and
- a first responding module, configured to, in response to the data acquisition request, determine target data of the first member information as request data corresponding to the data acquisition request, and output the request data.

In some embodiments, the data processing operation includes a data setting operation, and the data processing unit includes:
- a second determination module, configured to determine a data setting request for second member information of the at least one piece of the member information; where the data setting request includes setting data; and
- a second responding module, configured to, in response to the data setting request, updating target data of the second member information to the setting data.

In some embodiments, the data processing operation includes a data addition operation, and the data processing unit includes:
- a third determination module, configured to determine a data addition request for third member information; where the data addition request includes added third member information and added data corresponding to the third member information; and
- a third responding module, configured to, in response to the data addition request, generate a data member corresponding to the third member information, and determine the added data as target data of the data member of the third member information.

In a possible design, the apparatus further includes:
- a creation determination unit, configured to determine an object creation request of the target structure;
- an object creation unit, configured to, in response to the object creation request, generate a target object corresponding to the target structure;
- a member determination unit, configured to determine target member information of the target object in the at least one piece of the member information; and
- a data determination unit, configured to determine member data of the target member information and obtain second driving data corresponding to the target object.

Figure 6:
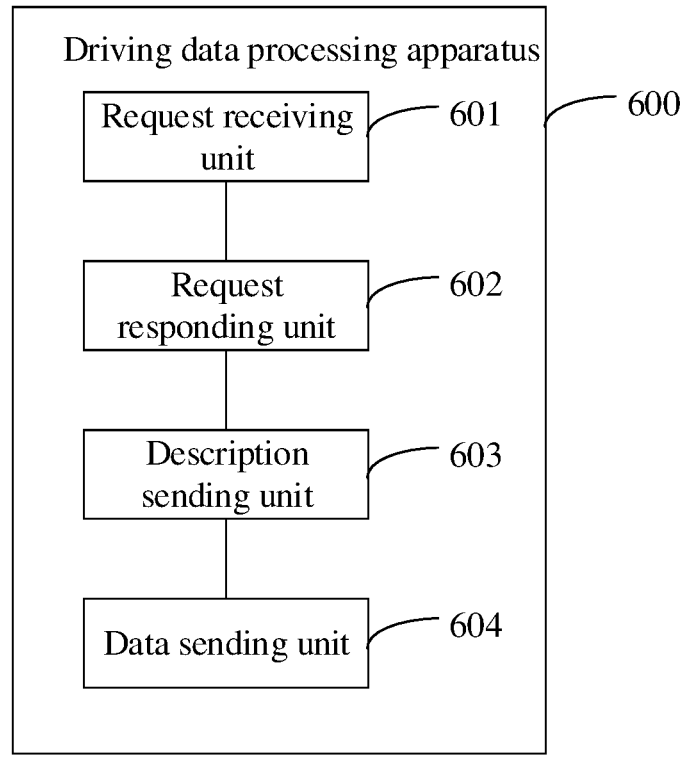
FIG. 6 is a schematic structural diagram of a driving data processing apparatus provided according to a sixth embodiment of the present disclosure.

As shown in FIG. 6, FIG. 6 is a schematic structural diagram of a driving data processing apparatus according to a sixth embodiment of the present disclosure. The driving data processing apparatus can be configured in a target vehicle. The driving data processing apparatus 600 can include the following units:
- a request receiving unit 601, configured to receive a data collection request sent by an electronic device;
- a request responding unit 602, configured to, in response to the data collection request, determine a target descriptor corresponding to a target structure;
- a description sending unit 603, configured to send the target descriptor to the electronic device; and
- a data sending unit 604, configured to send first driving data generated by using the target structure to the electronic device; where the first driving data uses a binary number system; the first driving data is converted into target data corresponding to at least one piece of member information respectively by the electronic device using the target descriptor of the target structure; and the target data uses a decimal number system.

In the embodiment of the present disclosure, the target vehicle receives the data acquisition request sent by the electronic device, and determines the target descriptor corresponding to the target structure in response to the data collection request. The target descriptor is sent to the electronic device. The first driving data generated by using the target structure is sent to the electronic device. The first driving data is represented in binary. The first driving data is converted into the target data corresponding to the at least one piece of the member information respectively by the electronic device using the target descriptor of the target structure. The target data is represented in decimal. By sending the target descriptor and the first driving data to the electronic device, the electronic device can accurately parse the first driving data using the target descriptor, which realizes accurate monitoring of the driving data in the driving system of the target vehicle.

As an embodiment, the request responding unit includes:
- a target determination module, configured to run a descriptor generation function corresponding to the target structure to obtain the target descriptor corresponding to the target structure.

In some embodiments, the apparatus further includes:
- an initial generation unit, configured to create initial driving data based on the target structure;

where the description sending unit includes:
- a data sending module, configured to send the target descriptor and the initial driving data to the electronic device, where the initial driving data is used to determine a structure name of the target structure, and a mapping relationship between the structure name and the target descriptor is stored in a description pool.

The driving data processing apparatuses in the embodiments of the present disclosure can implement the driving data processing methods in the above embodiments, which will not be repeated here.

It should be noted that the driving system in the embodiments is not a driving system for a specific user, and cannot reflect personal information of a specific user. It should be noted that the driving data in the embodiments comes from a public data set.

In the technical solutions of the present disclosure, collection, storage, use, processing, transmission, provision, disclosure and other processing of user personal information involved are all in compliance with provisions of relevant laws and regulations, and do not violate public order and good customs.

According to embodiments of the present disclosure, the present disclosure also provides an electronic device, a readable storage medium and a computer program product.

According to an embodiment of the present disclosure, the present disclosure also provides a computer program product. The computer program product includes a computer program which is stored in a readable storage medium, and at least one processor of an electronic device can read the computer program from the readable storage medium. The at least one processor executes the computer program to cause the electronic device to execute the solution provided by any of the above embodiments.

Figure 7:
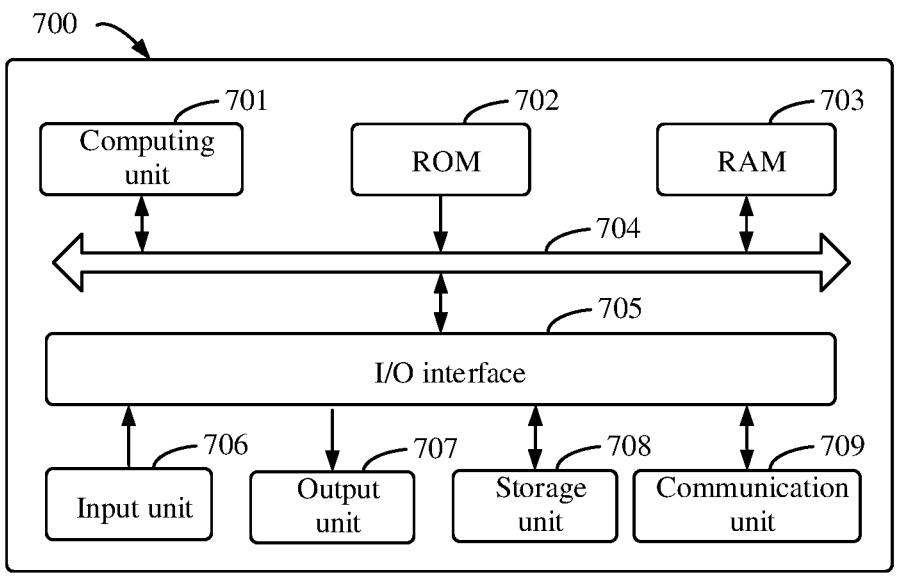
FIG. 7 is a block diagram of an electronic device for implementing a driving data processing method according to an embodiment of the present disclosure.

FIG. 7 shows a schematic block diagram of an example electronic device 700 that can be used to implement embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing devices. The components, their connections and relationships, and their functions shown herein are merely examples and are not intended to limit the implementation of the present disclosure described and/or claimed herein.

As shown in FIG. 7, the device 700 includes a computing unit 701 that may perform various appropriate actions and processing according to a computer program stored in a read only memory (ROM) 702 or loaded from a storage unit 708 into a random access memory (RAM) 703. In the RAM 703, various programs and data necessary for operations of the device 700 may also be stored. The computing unit 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, such as a keyboard, a mouse, etc.; an output unit 707, such as various types of displays, speakers, etc.; a storage unit 708, such as a magnetic disk, an optical disc, etc.; and a communication unit 709, such as a network card, a modem, a wireless communication transceiver, etc. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 701 executes various methods and processing described above, such as a driving data processing method. For example, in some embodiments, the driving data processing method may be implemented as a computer software program tangibly embodied in a machine-readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of the driving data processing method described above may be performed. Alternatively, in other embodiments, the computing unit 701 may be configured to execute the driving data processing method by any other suitable means (for example, by means of firmware).

Various implementations of systems and techniques described above herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. These various implementations may include: being implemented in one or more computer programs, where the one or more computer programs may be executed and/or interpreted on a programmable system including at least one programmable processor, and the programmable processor may be a special-purpose or general-purpose programmable processor, and may receive data and instructions from a storage system, at least one input apparatus and at least one output apparatus, and transmit data and instructions to the storage system, the at least one input apparatus and the at least one output apparatus.

Figure 8:
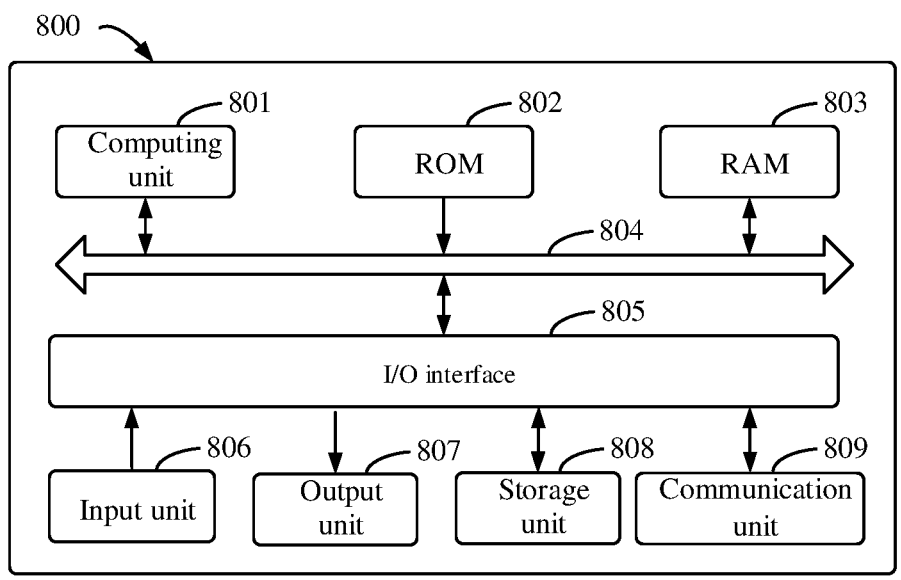
FIG. 8 is a block diagram of an automatic driving vehicle for implementing a driving data processing method according to an embodiment of the present disclosure.

Furthermore, FIG. 8 shows a schematic block diagram of an automatic driving vehicle 800 that can be used to implement embodiments of the present disclosure. As shown in FIG. 8, a target vehicle 800 can include electronic components such as a computing unit 801, a read only memory (ROM) 802, a random access memory (RAM) 803, a bus 804, an I/O interface 805, an input unit 806, an output unit 807, a storage unit 808, and a communication unit 809. A connection manner between the electronic components is the same as that in the block diagram shown in FIG. 7, and will not be repeated here. The computing unit 801 shown in FIG. 8 may include at least one processor, and the at least one processor is configured with a driving system of the target vehicle.

Program code for implementing the methods of the present disclosure may be written in any combination of one or more programming languages. These program codes may be provided to a processor or a controller of a general-purpose computer, a special-purpose computer or other programmable data processing apparatuses, so that the program code, when executed by the processor or the controller, enables functions/operations specified in the flowchart and/or the block diagram to be implemented. The program code may be entirely executed on the machine, partially executed on the machine, partially executed on the machine and partially executed on a remote machine as a separate software package, or entirely executed on a remote machine or a server.

In the context of the present disclosure, a machine-readable medium may be a tangible medium that may include or store a program for use by or in combination with an instruction execution system, apparatus, or device. The machine-readable medium may be a machine-readable signal medium or a machine-readable storage medium. The machine readable media may include, but are not limited to, an electronic, magnetic, optical, electromagnetic, infrared or semiconductor system, apparatus, or device, or any suitable combination of the foregoing. More specific examples of machine-readable storage medium may include one or more wire-based electrical connections, a portable computer disk, a hard disk, a random access memory (RAM), a read only memory (ROM), an erasable programmable read only memory (EPROM or flash memory), an optical fiber, a compact disk read only memory (CD-ROM), an optical storage device, a magnetic storage device, or any suitable combination of the foregoing.

In order to provide interaction with a user, the systems and techniques described herein may be implemented on a computer, and the computer has: a display device (e. g., a CRT (cathode ray tube) or LCD (liquid crystal display) monitor) for displaying information to the user; and a keyboard and a pointing apparatus (e. g., a mouse or a trackball), through which the user can provide input to the computer through the keyboard and the pointing device. Other kinds of apparatuses may also be used to provide interaction with the user; for example, a feedback provided to the user may be any form of sensor feedback (e. g., a visual feedback, an auditory feedback, or a tactile feedback); and an input from the user may be received in any form (including an acoustic input, a voice input or a tactile input).

The systems and techniques described herein may be implemented in a computing system including a back-end component (e. g., as a data server), or a computing system including a middleware component (e. g., an application server), or a computing system including a front-end component (e. g., a user computer having a graphical user interface or a web browser through which a user may interact with implementations of the systems and techniques described herein), or a computing system including any combination of such a back-end component, middleware component or front-end components. The components of the system may be interconnected in any form or medium of digital data communication (e. g., a communication network). Examples of the communication network include a local area networks (LAN), a wide area networks (WAN), and the Internet.

A computer system may include a client and a server. The client and server are generally far away from each other and usually interact through a communication network. A relationship of client and server is generated by a computer program running on a corresponding computer and having a client-server relationship with each other. The server may be a cloud server, also known as a cloud computing server or a cloud host, which is a host product in a cloud computing service system to solve problems of difficult management and weak business expansion in a traditional physical host and a VPS service (Virtual Private Server, VPS). The server may also be a server of a distributed system or a server combined with a blockchain.

It should be understood that steps may be reordered, added, or deleted using various forms of processes shown above. For example, the steps recorded in the present disclosure may be performed in parallel, in sequence, or in different orders. As long as desired results of the technical solutions of the present disclosure can be achieved, no limitation is imposed herein.

The above specific embodiments do not constitute a limitation to a protection scope of the present disclosure. It should be understood by those skilled in the art that various modifications, combinations, sub-combinations and substitutions may be made according to design requirements and other factors. Any modification, equivalent replacement and improvements made within the spirit and principles of the present disclosure should be included within the protection scope of the present disclosure.

What is claimed is:

1. A driving data processing method, comprising:
    collecting first driving data generated by using a target structure in a driving system of a target vehicle; wherein the first driving data uses a binary number system;
    determining a target descriptor corresponding to the target structure from at least one structure descriptor of a description pool; wherein the target descriptor is used to describe member information of the target structure;
    parsing the target descriptor to obtain at least one piece of member information of the target structure;
    parsing the first driving data according to the at least one piece of the member information to obtain target data corresponding to each of the at least one piece of the member information; wherein the target data uses a decimal number system; and
    performing a data processing operation based on the target data corresponding to each of the at least one piece of the member information;
    wherein determining the target descriptor corresponding to the target structure from the at least one structure descriptor of the description pool comprises:
    determining a target structure name of the target structure;
    making a query for a target mapping relationship corresponding to the target structure name based on at least one mapping relationship in the description pool;
    wherein the mapping relationship comprises a corresponding relationship between a structure name and a structure descriptor; and
    determining a structure descriptor in the target mapping relationship as the target descriptor.

2. The method according to claim 1, further comprising:
    receiving a structure descriptor and initial driving data corresponding to any structure sent by the driving system;
    determining a structure name of the structure according to the initial driving data; and
    establishing a mapping relationship between the structure descriptor and the structure name, and storing the mapping relationship in the description pool.

3. The method according to claim 2, wherein the data processing operation comprises a data acquisition operation, and performing the data processing operation based on the target data corresponding to each of the at least one piece of the member information comprises:
    determining a data acquisition request for first member information of the at least one piece of the member information; and
    in response to the data acquisition request, determining target data of the first member information as request data corresponding to the data acquisition request, and outputting the request data.

4. The method according to claim 1, wherein the data processing operation comprises a data acquisition operation, and performing the data processing operation based on the target data corresponding to each of the at least one piece of the member information comprises:
    determining a data acquisition request for first member information of the at least one piece of the member information; and
    in response to the data acquisition request, determining target data of the first member information as request data corresponding to the data acquisition request, and outputting the request data.

5. The method according to claim 1, wherein the data processing operation comprises a data setting operation, and performing the data processing operation based on the target data corresponding to each of the at least one piece of the member information comprises:
 determining a data setting request for second member information of the at least one piece of the member information; wherein the data setting request comprises setting data; and
 in response to the data setting request, updating target data of the second member information to the setting data.

6. The method according to claim 1, wherein the data processing operation comprises a data addition operation, and performing the data processing operation based on the target data corresponding to each of the at least one piece of the member information comprises:
 determining a data addition request for third member information of the at least one piece of the member information; wherein the data addition request comprises added third member information and added data corresponding to the third member information; and
 in response to the data addition request, generating a data member corresponding to the third member information, and determining the added data as target data of the data member of the third member information.

7. The method of according to claim 1, after parsing the target descriptor to obtain the at least one piece of the member information of the target structure, further comprising:
 determining an object creation request of the target structure;
 in response to the object creation request, generating a target object corresponding to the target structure;
 determining target member information of the target object in the at least one piece of the member information; and
 obtaining second driving data corresponding to the target object based on member data of the target member information.

8. The method according to claim 1, wherein the parsing the target descriptor to obtain at least one piece of member information of the target structure, comprising: dividing, by an electronic device, a structure type and the member information of the target descriptor to obtain the at least one piece of the member information.

9. The method according to claim 1, wherein the parsing the first driving data according to the at least one piece of the member information to obtain target data corresponding to each of the at least one piece of the member information, comprising:
 converting the first driving data into a character string; and
 parsing the character string into the target data corresponding to the at least one piece of the member information respectively according to the at least one piece of the member information.

10. The method according to claim 1, wherein the target structure is a structure generated by using an interactive data language (IDL).

11. A driving data processing apparatus, comprising:
 at least one processor; and
 a memory communicatively connected to the at least one processor; wherein,
 the memory stores instructions executable by the at least one processor, and the at least one processor is configured to:
 collect first driving data generated by using a target structure in a driving system of a target vehicle; wherein the first driving data uses a binary number system;
 determine a target descriptor corresponding to the target structure from at least one structure descriptor of a description pool; wherein the target descriptor is used to describe member information of the target structure;
 parse the target descriptor to obtain at least one piece of member information of the target structure;
 parse the first driving data according to the at least one piece of the member information to obtain target data corresponding to each of the at least one piece of the member information; wherein the target data uses a decimal number system; and
 perform a data processing operation based on the target data corresponding to each of the at least one piece of the member information;
 wherein the at least one processor is configured to:
 determine a target structure name of the target structure;
 make a query for a target mapping relationship corresponding to the target structure name based on at least one mapping relationship in the description pool; wherein the mapping relationship comprises a corresponding relationship between a structure name and a structure descriptor; and
 determine a structure descriptor in the target mapping relationship as the target descriptor.

12. A non-transitory computer readable storage medium having computer instructions stored thereon, wherein the computer instructions are used to cause a computer to execute the method according to claim 1.

13. The apparatus according to claim 11, wherein the at least one processor is further configured to:
 divide a structure type and the member information of the target descriptor to obtain the at least one piece of the member information.

14. The apparatus according to claim 11, wherein the at least one processor is further configured to:
 convert the first driving data into a character string; and
 parse the character string into the target data corresponding to the at least one piece of the member information respectively according to the at least one piece of the member information.

* * * * *